(12) United States Patent
Kendrick et al.

(10) Patent No.: US 7,973,937 B1
(45) Date of Patent: Jul. 5, 2011

(54) NEAR FIELD SUPPRESSION WITH A MULTI-APERTURE IMAGING SYSTEM

(75) Inventors: Richard L. Kendrick, San Mateo, CA (US); Eric H. Smith, San Jose, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 1325 days.

(21) Appl. No.: 11/505,990

(22) Filed: Aug. 18, 2006

(51) Int. Cl.
*G01J 3/45* (2006.01)
(52) U.S. Cl. ........................................ 356/456
(58) Field of Classification Search .................. 356/450, 356/456, 451
See application file for complete search history.

(56) References Cited

U.S. PATENT DOCUMENTS

| | | | | |
|---|---|---|---|---|
| 4,136,954 | A * | 1/1979 | Jamieson | 356/456 |
| 6,714,304 | B2 * | 3/2004 | Ota | 356/451 |
| 6,882,427 | B1 | 4/2005 | Kendrick et al. | |
| 7,105,755 | B2 * | 9/2006 | Imamura | 200/11 DA |
| 2004/0095580 | A1 * | 5/2004 | Kendrick et al. | 356/451 |

* cited by examiner

*Primary Examiner* — Tarifur Chowdhury
*Assistant Examiner* — Jonathan M Hansen
(74) *Attorney, Agent, or Firm* — McDermott Will & Emery LLP

(57) ABSTRACT

A method for reducing noise in a multi-aperture imaging system is provided. Each sub-collector of the system, at least one of which has an adjustable optical path length, collects a portion of a wavefront. The adjustable optical path length is varied to each of a set of predetermined lengths to generate interference patterns. Each interference pattern is recorded at an image plane of the system to generate a recorded interference pattern made up of pixels. Pixel intensity data sets are generated, each of which includes a pixel intensity level from a corresponding one of the pixels from each recorded interference pattern. Each pixel intensity data set is Fourier transformed, and in each Fourier transformed data set, spatial frequencies having power values above a predetermined level are identified. The power levels exceeding the threshold are measured and a resultant image is constructed, where each image pixel thereof corresponds to one pixel intensity data set and has one or more intensity values corresponding to the measured power values for that corresponding pixel intensity data set.

18 Claims, 4 Drawing Sheets

NEAR FIELD SUPPRESSION WITH A MULTI-APERTURE IMAGING SYSTEM

STATEMENT REGARDING FEDERALLY SPONSORED RESEARCH OR DEVELOPMENT

Not applicable.

FIELD OF THE INVENTION

The present invention generally relates to multi-aperture imaging systems and, in particular, relates to noise suppression in a multi-aperture imaging system.

BACKGROUND OF THE INVENTION

When using a multi-aperture imaging system to view a distant object, undesirable noise caused by the radiation emitted by various elements and structures in the telescope (i.e., near field radiation) can obscure the signal of interest by the time it reaches the image plane of the imaging system. This is particularly true in the infrared region of the electromagnetic spectrum, as the elements of imaging systems tend to emit relatively large amounts of near field radiation in this region.

One approach to reducing the noise contributed by near field radiation is to aggressively cool the imaging system elements, thereby reducing the radiation they give off in the infrared region of the spectrum. The cooling systems used in this approach are undesirably expensive and heavy, increasing the launch costs and operational complexity of space-based telescopes. Despite the best efforts at cooling such imaging systems, their signal-to-noise ratio (SNR) is still limited by the noise contribution of near field radiation.

Accordingly, there is a need to reduce the noise contribution of near field radiation in multi-aperture imaging systems. The present invention satisfies this need and provides other advantages as well.

SUMMARY OF THE INVENTION

In accordance with the present invention, noise contributed by near field radiation in a multi-aperture imaging system is reduced. Portions of an incoming wavefront are collected by a number of sub-collectors. Because the wavefront contains common information about a distant object (i.e., the signal of interest) in each collected portion, the signal of interest can be coherently combined and destructively interfered, creating interference patterns at an image plane of the system. Because the near field radiation is not from a common object, however, the contribution of near field radiation in each collected portion of the wavefront can not be coherently combined or destructively interfered. Accordingly, a number of interference patterns corresponding to different optical path length adjustments in one or more of the sub-collectors of the multi-aperture imaging system are recorded. From corresponding pixels in each recorded interference pattern, pixel intensity data sets are created. Each pixel intensity data set is Fourier transformed to identify and measure spatial frequencies for which the power level is above a predetermined threshold power level. The information corresponding to these spatial frequencies of interest is then used to construct a resultant image in which the noise contribution of near field radiation is reduced.

According to one embodiment of the present invention, a method for reducing noise in a multi-aperture imaging system is provided. The multi-aperture imaging system has a plurality of sub-collectors, each of which collects a portion of a wavefront that includes noise and a signal of interest. At least one of the sub-collectors has an adjustable optical path length. The method includes the step of varying the adjustable optical path length of the at least one sub-collector to each of a set of predetermined optical path lengths to generate a plurality of interference patterns. Each interference pattern corresponds to a respective one of the set of predetermined optical path lengths. The method further includes the step of recording each of the plurality of interference patterns at an image plane of the multi-aperture imaging system to generate a corresponding plurality of recorded interference patterns, each of which is comprised of a plurality of pixels. The method further includes the steps of generating a plurality of pixel intensity data sets, each pixel intensity data set including a pixel intensity level from a corresponding one of the plurality of pixels from each of the recorded interference patterns, Fourier transforming each pixel intensity data set to generate a corresponding Fourier transformed pixel intensity data set and identifying, for each Fourier transformed pixel intensity data set, one or more spatial frequencies of interest having power values above a predetermined threshold power level. The method further includes the steps of measuring, for each Fourier transformed pixel intensity data set, the one or more power values of the one or more spatial frequencies of interest to generate one or more measured power values and constructing a resultant image having a plurality of image pixels. Each image pixel corresponds to one of the plurality of pixel intensity data sets. Each image pixel has one or more intensity values corresponding to the one or more measured power values for the corresponding pixel intensity data set.

According to another embodiment of the present invention, a computer-readable medium carries one or more sequences of instructions for reducing noise in a multi-aperture imaging system. The multi-aperture imaging system has a plurality of sub-collectors, each of which collects a portion of a wavefront that includes noise and a signal of interest. At least one of the sub-collectors has an adjustable optical path length. The execution of the one or more sequences of instructions by one or more processors causes the one or more processors to perform the step of varying the adjustable optical path length of the at least one sub-collector to each of a set of predetermined optical path lengths to generate a plurality of interference patterns. Each interference pattern corresponds to a respective one of the set of predetermined optical path lengths. The execution of the one or more sequences of instructions by one or more processors causes the one or more processors to further perform the step of recording each of the plurality of interference patterns at an image plane of the multi-aperture imaging system to generate a corresponding plurality of recorded interference patterns, each of which is comprised of a plurality of pixels. The execution of the one or more sequences of instructions by one or more processors causes the one or more processors to further perform the steps of generating a plurality of pixel intensity data sets, each pixel intensity data set including a pixel intensity level from a corresponding one of the plurality of pixels from each of the recorded interference patterns, Fourier transforming each pixel intensity data set to generate a corresponding Fourier transformed pixel intensity data set and identifying, for each Fourier transformed pixel intensity data set, one or more spatial frequencies of interest having power values above a predetermined threshold power level. The execution of the one or more sequences of instructions by one or more processors causes the one or more processors to further perform the steps of measuring, for each Fourier transformed pixel intensity data set, the one or more power values of the one or more spatial frequencies of interest to generate one or more measured power values and constructing a resultant image having a plurality of image pixels. Each image pixel corresponds to one of the plurality of pixel intensity data sets. Each image pixel has one or more intensity values corresponding to the one or more measured power values for the corresponding pixel intensity data set.

According to another embodiment, the present invention is a multi-aperture imaging system including a plurality of sub-collectors, each of which is configured to collect a portion of a wavefront that includes noise and a signal of interest. At least one of the sub-collectors has an adjustable optical path length. The multi-aperture imaging system further includes a combiner disposed optically downstream from the plurality of sub-collectors. The combiner is configured to combine the collected portions of the wavefront and to interfere the combined collected portions of the wavefront at an image plane of the multi-aperture system. The multi-aperture imaging system further includes one or more processors configured to execute the step of varying the adjustable optical path length of the at least one sub-collector to each of a set of predetermined optical path lengths to generate a plurality of interference patterns Each interference pattern corresponds to a respective one of the set of predetermined optical path lengths. The one or more processors are further configured to execute the step of recording each of the plurality of interference patterns at the image plane to generate a corresponding plurality of recorded interference patterns, each of which is comprised of a plurality of pixels. The one or more processors are further configured to execute the step of generating a plurality of pixel intensity data sets, each including a pixel intensity level from a corresponding one of the plurality of pixels from each of the recorded interference patterns. The one or more processors are further configured to execute the steps of Fourier transforming each pixel intensity data set to generate a corresponding Fourier transformed pixel intensity data set and identifying, for each Fourier transformed pixel intensity data set, one or more spatial frequencies of interest having power values above a predetermined threshold power level. The one or more processors are further configured to execute the steps of measuring, for each Fourier transformed pixel intensity data set, the one or more power values of the one or more spatial frequencies of interest to generate one or more measured power values and constructing a resultant image having a plurality of image pixels. Each image pixel corresponds to one of the plurality of pixel intensity data sets. Each image pixel has one or more intensity values corresponding to the one or more measured power values for the corresponding pixel intensity data set.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

Figure 1:
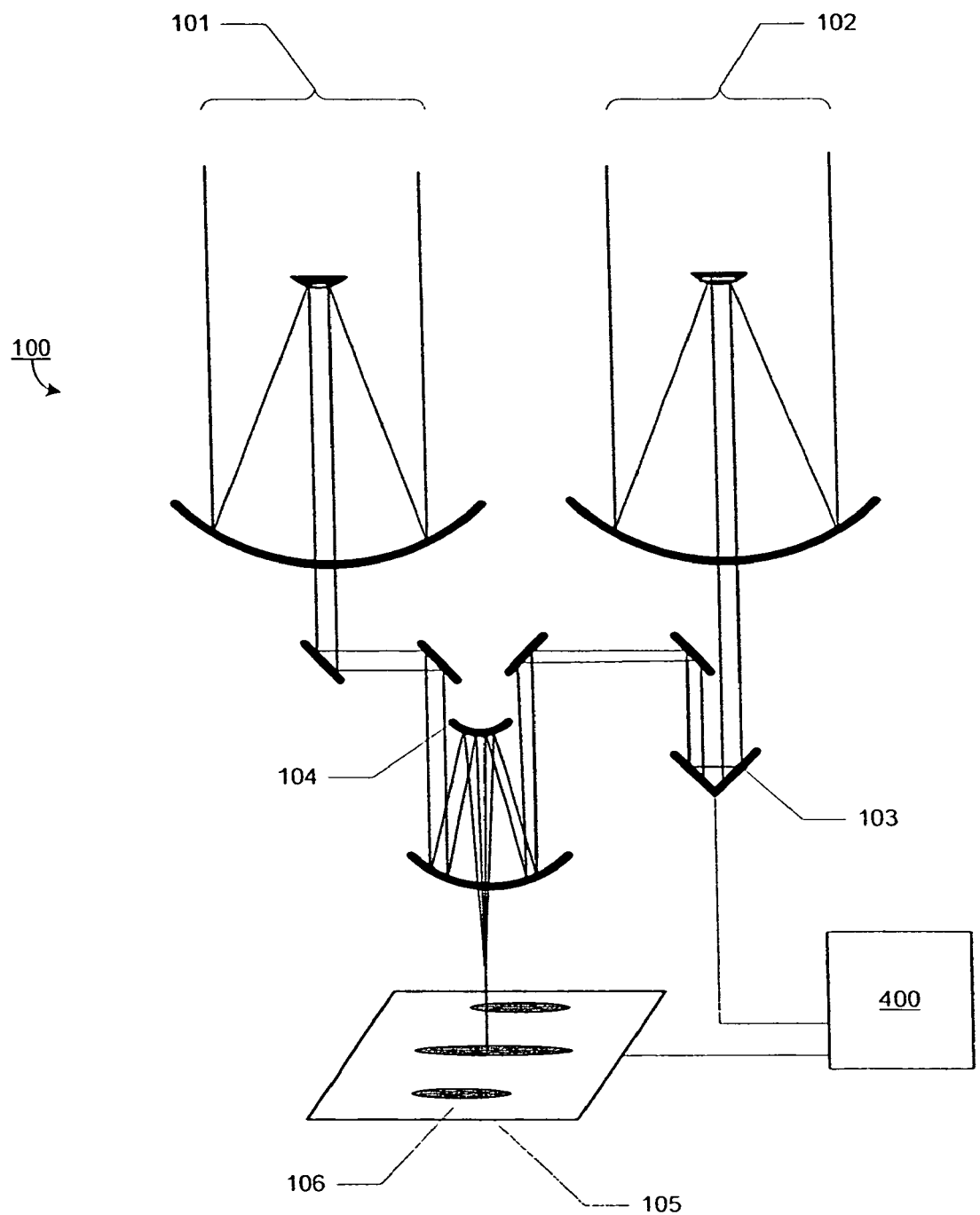
FIG. 1 depicts a multi-aperture imaging system according to one embodiment of the present invention.

FIG. 1 depicts a multi-aperture imaging system 100 according to one aspect of the present invention. Multi-aperture imaging system 100 includes sub-collectors 101 and 102, each of which is configured to collect part of an incoming wavefront. Sub-collector 102 is provided with a trombone mirror pair 103 for adjusting the optical path length of sub-collector 102. The portions of the wavefront which are collected by sub-collectors 101 and 102 are combined in combiner 104, located optically downstream from sub-collectors 101 and 102. Combiner 104 interferes the collected portions of the wavefront at an image plane 105 of multi-aperture imaging system 100. Multi-aperture imaging system 100 may also include a computer system with one or more processors, such as computer system 400, for executing process steps to reduce noise in multi-aperture imaging system 100, as described in greater detail below with respect to FIG. 4.

While multi-aperture imaging system 100 has been illustrated as including only two sub-collectors 101 and 102, the scope of the present invention is not limited to such an arrangement. Rather, the present invention has application to multi-aperture imaging systems with any number of sub-collectors greater than one. Similarly, while only one sub-collector has been illustrated as including an adjustable optical path, the present invention has application to multi-aperture imaging systems in which any number of sub-collectors greater than or equal to one include an adjustable optical path, as will be apparent to one skilled in the art.

The incoming wavefront includes both a signal of interest and noise from near field radiation. Because each collected portion of the wavefront contains common information about a distant object (i.e., the signal of interest), the signal of interest can be coherently combined and destructively interfered, creating interference patterns 106 in the image plane. Because the near field radiation in each collected portion is not contributed by a common source, however, the near field radiation in each collected portion of the wavefront can not be coherently combined or destructively interfered. This property of near field radiation can be exploited to reduce the noise contribution thereof at image plane 105, as described in more detail below.

Figure 2:
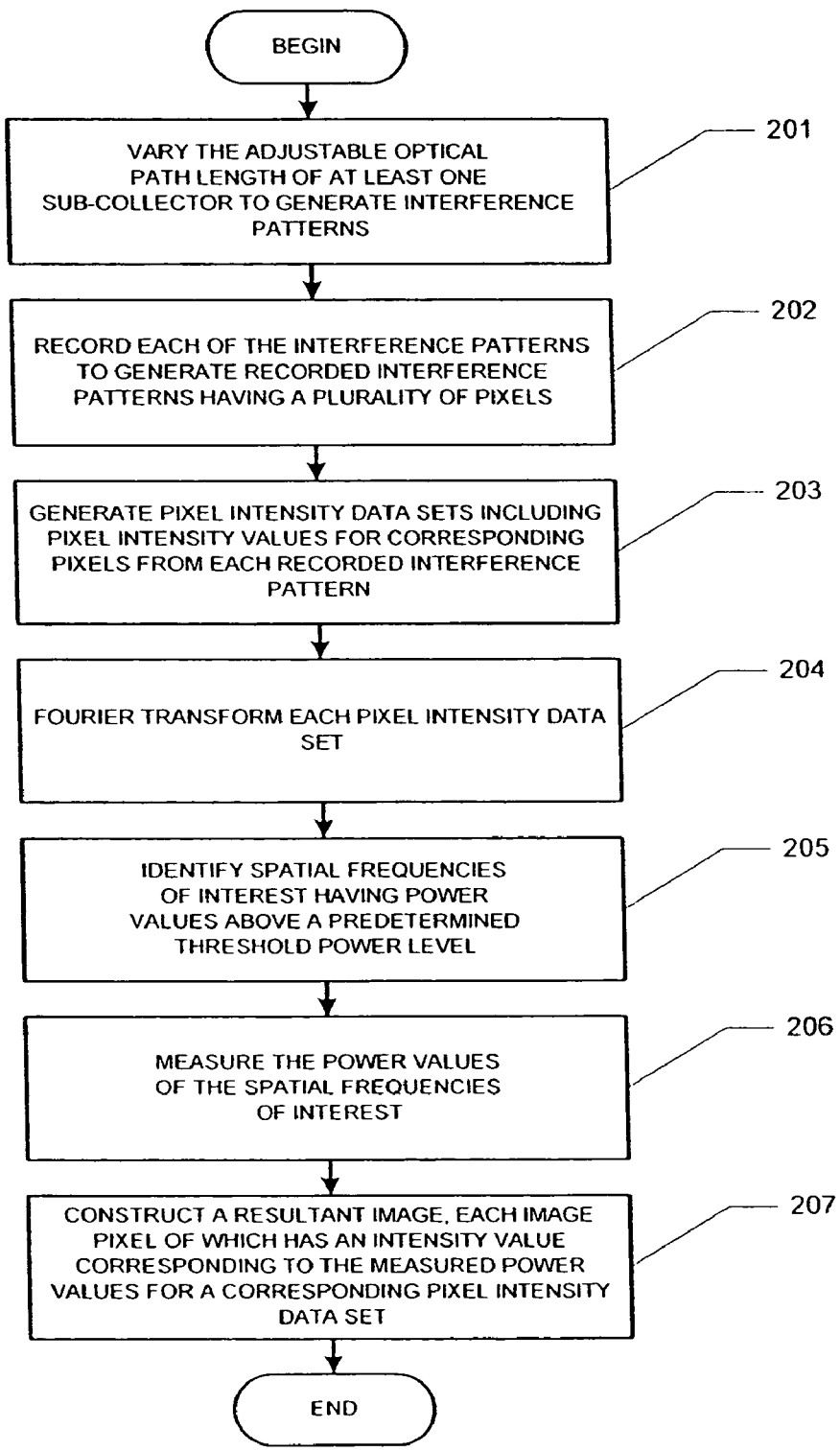
FIG. 2 is a flow chart depicting a method for reducing noise in a multi-aperture imaging system according to one embodiment of the present invention.

Turning to FIG. 2, a method for reducing noise in a multi-aperture imaging system is depicted according to one embodiment of the present invention. In step 201, the optical path length of at least one of the sub-collectors (e.g., sub-collector 102) in multi-aperture imaging system 100 is varied to each of a number of predetermined optical path lengths to generate a corresponding number of interference patterns, such as interference pattern 106. Interference pattern 106 includes contributions from both the signal of interest (which has been constructively and/or destructively interfered) as well as from near field radiation (which has been combined, rather than interfered).

According to the present exemplary aspect, the optical path length is varied by translating trombone mirror pair 103. The scope of the present invention is not limited to such an arrangement, however. As will be apparent to those of skill in the art, the present invention has application to multi-aperture imaging systems in which an adjustable optical path length is adjusted in any other manner.

In step 202, each of the interference patterns thus generated are recorded at image plane 105 to generate recorded interference patterns which are made up of a number of pixels. Each recorded interference pattern corresponds to the adjustable optical path being set to one of the predetermined path lengths. As will be apparent to one of skill in the art, as the adjustable optical path length is modulated, the location on the image plane of the interference fringes which result from the constructive and/or destructive interference of the signal of interest, as well as the intensity thereof, is modulated as well. The noise contributed by near field radiation is not modulated, however, as the source thereof is not common to the various collected portions of the incoming wavefront. Accordingly, the interference pattern created by the signal of interest, which varies with the optical path length modulation, can be extracted from the noise contributed by the near field radiation, which does not vary with the optical path length modulation, as will be described in greater detail below.

According to various aspects of the present invention, a charge-coupled device ("CCD") or a complementary metal-oxide semiconductor ("CMOS") image sensor may be used at image plane 105 to record the interference patterns. The scope of the present invention is not limited to these particular arrangements, however, as any other image sensor known to those of skill in the art may also be used.

In step 203, pixel intensity data sets are generated from the recorded interference patterns captured in step 202. Each pixel intensity data set includes a pixel intensity level from a corresponding one of the plurality of pixels from each of the recorded interference patterns. The generation of a pixel intensity set can be more easily understood with reference to FIG. 3. A number n of recorded interference patterns 301 are illustrated, each of which corresponds to the adjustable optical path being set to one of the predetermined positions (e.g., position 1, 2, ... n). Each recorded interference pattern 301 is made up of a number of pixels, such as lower left pixel 302. A single pixel intensity data set 303 includes the pixel intensity levels (e.g., $i_1, i_2, \ldots i_n$) of corresponding pixels (e.g., lower left pixels) from each of the recorded interference patterns 301. Pixel intensity data set 303 is illustrated both in graphical format (as pixel intensity level over adjustable optical path position) and as a data set.

Returning to FIG. 2, each of the pixel intensity data sets 303 generated in step 203 are Fourier transformed in step 204 to generate a corresponding Fourier transformed pixel intensity data set in which the information from the pixel intensity data sets 303 is expressed in terms of power over spatial frequency. In step 205, one or more spatial frequencies of interest having power values above a predetermined threshold power level are identified in each Fourier transformed pixel intensity data set. These spatial frequencies with power levels exceeding the threshold represent the interference fringes contributed by the signal of interest being translated across the image plane as the adjustable optical path length is set to the various predetermined positions. Accordingly, the spatial frequencies with power levels below the predetermined threshold will be disregarded as including primarily noise contributed by near field radiation.

Figure 3:
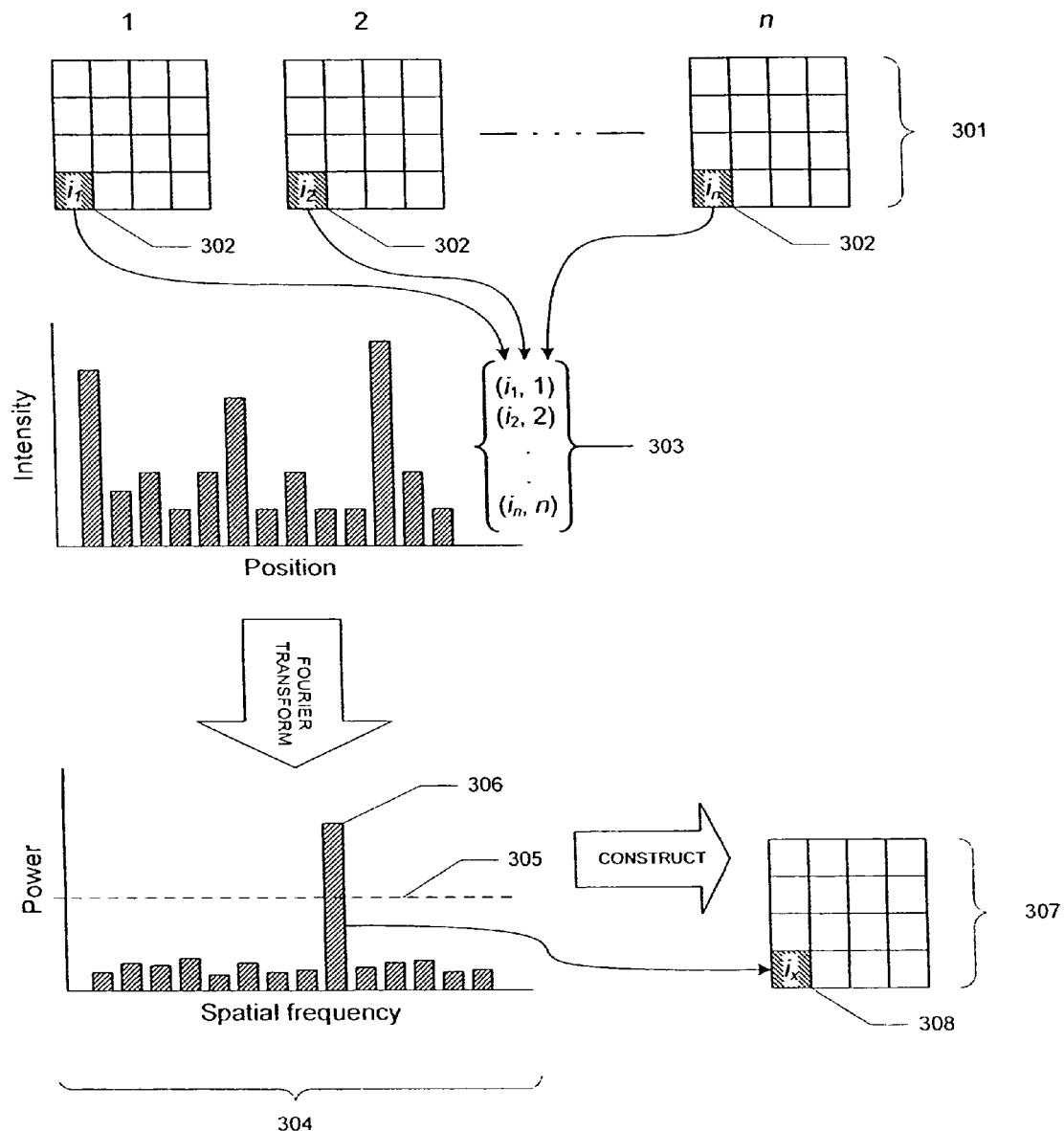
FIG. 3 is a block diagram depicting noise reduction in a multi-aperture imaging system according to one aspect of the present invention.

Steps 204 and 205 may be more easily understood with reference to FIG. 3, in which Fourier transformed pixel intensity data set 304 is illustrated graphically. The power level of spatial frequency 306 is greater than predetermined power level 305, indicating that the pixel intensity information in corresponding pixels 302 of recorded interference patterns 301 which corresponds to this spatial frequency of interest is contributed primarily by the signal of interest.

Returning to FIG. 2, the method continues in step 206, in which the power levels for the spatial frequencies of interest in each Fourier transformed pixel intensity data set 304 are measured. In step 207, these measured power values are used to construct a resultant image with reduced noise. The resultant image has the same number of pixels as each of the recorded interference patterns 301. Each pixel in the resultant image includes one or more intensity values which correspond to the power values at the spatial frequencies of interest in the corresponding pixel intensity data set. The construction of the resultant image may be more easily understood with reference to FIG. 3, in which the intensity information $i_x$ in a pixel 308 of resultant image 307 corresponds to the power value at spatial frequency of interest 306 in corresponding Fourier transformed pixel intensity data set 304.

While the exemplary embodiment described above illustrated a Fourier transformed pixel intensity data set 304 in which only one spatial frequency of interest 306 had a power value greater than a predetermined threshold power value 305, the present invention is not limited to such an arrangement. Rather, in an arrangement in which a Fourier transformed pixel intensity data set includes a number of spatial frequencies in which the power exceeds the threshold, the corresponding pixel in the resultant image may include a corresponding number of intensity levels, where each intensity level represents the intensity at a different spectral frequency. Alternatively, the power values from the number of spatial frequencies exceeding the threshold may be averaged to obtain a single intensity value corresponding to an average intensity at a number of spectral wavelengths.

According to one embodiment, the predetermined path lengths to which the adjustable optical path length is adjusted represent a long scan which includes a large number of positions across a wide range of optical path lengths. In this long scan arrangement, the total optical path difference between the position corresponding to the longest optical path length and the position corresponding to the shortest optical path length should be greater than ½ of a wavelength of interest (e.g., a wavelength in which image information is sought, or the longest wavelength in a range of wavelengths in which image information is sought). According to another embodiment, the predetermined path lengths represent the adjustable optical path length being dithered back and forth between two positions, with an optical path difference between the two positions being greater than ½ of a wavelength of interest. In the long scan embodiment, the number of predetermined positions should be sufficiently large (e.g., greater than 20) to ensure that a sufficient number of spatial frequencies can be included in the Fourier transformed interference patterns. In the dithering embodiment, however, the number of predetermined positions (i.e., the number of times the adjustable optical path length is varied between the two positions) need not be as large (e.g. from 5 to 10 may be sufficient for many applications).

Figure 4:
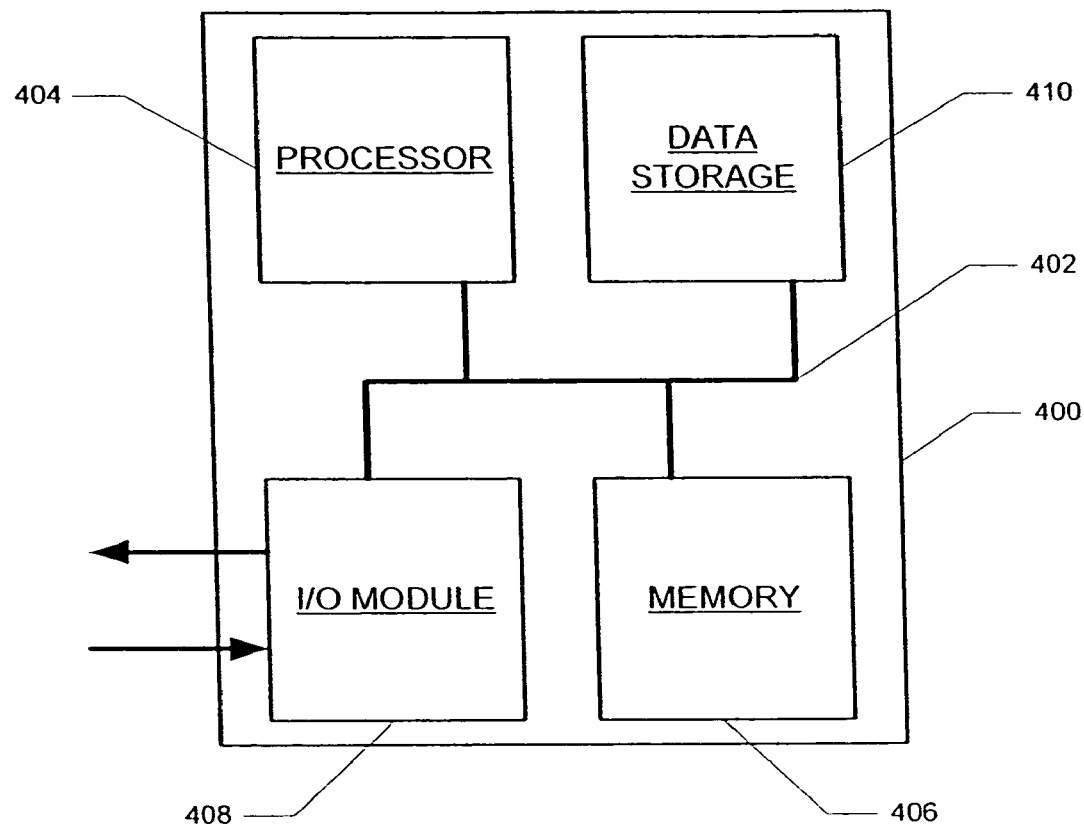
FIG. 4 is a block diagram that illustrates a computer system upon which an embodiment of the present invention may be implemented.

FIG. 4 is a block diagram that illustrates a computer system 400 upon which an embodiment of the present invention may be implemented. Computer system 400 includes a bus 402 or other communication mechanism for communicating information, and a processor 404 coupled with bus 402 for processing information. Computer system 400 also includes a memory 406, such as a random access memory ("RAM") or other dynamic storage device, coupled to bus 402 for storing information and instructions to be executed by processor 404. Memory 406 may also be used for storing temporary variable or other intermediate information during execution of instructions to be executed by processor 404. Computer system 400 further includes a data storage device 410, such as a magnetic disk or optical disk, coupled to bus 402 for storing information and instructions.

Computer system 400 may be coupled via I/O module 408 to a display device (not illustrated), such as a cathode ray tube ("CRT") or liquid crystal display ("LCD") for displaying information to a computer user. An input device, such as, for example, a keyboard or a mouse may also be coupled to computer system 400 via I/O module 408 for communicating information and command selections to processor 404.

According to one embodiment of the invention, reducing the noise in a multi-aperture imaging system is performed by a computer system 400 in response to processor 404 executing one or more sequences of one or more instructions contained in memory 406. Such instructions may be read into memory 406 from another computer-readable medium, such as data storage device 410. Execution of the sequences of instructions contained in main memory 406 causes processor 404 to perform the process steps described herein. One or more processors in a multi-processing arrangement may also be employed to execute the sequences of instructions contained in memory 406. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 404 for execution. Such a medium may take many forms, including, but not limited to, non-volatile media, volatile media, and transmission media. Non-volatile media include, for example, optical or magnetic disks, such as data storage device 410. Volatile media include dynamic memory, such as memory 406. Transmission media include coaxial cables, copper wire, and fiber optics, including the wires that comprise bus 402. Transmission media can also take the form of acoustic or light waves, such as those generated during radio frequency and infrared data communications. Common forms of computer-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

While the present invention has been particularly described with reference to the various figures and embodiments, it should be understood that these are for illustration purposes only and should not be taken as limiting the scope of the invention. There may be many other ways to implement the invention. Many changes and modifications may be made to the invention, by one having ordinary skill in the art, without departing from the spirit and scope of the invention.

What is claimed is:

1. A method for reducing noise in a multi-aperture imaging system having a plurality of sub-collectors, each sub-collector collecting a portion of a wavefront including noise and a signal of interest, at least one of the sub-collectors having an adjustable optical path length, the method comprising the steps of:

varying the adjustable optical path length of the at least one sub-collector to each of a set of predetermined optical path lengths to generate a plurality of interference patterns, each interference pattern corresponding to a respective one of the set of predetermined optical path lengths;

recording each of the plurality of interference patterns at an image plane of the multi-aperture imaging system to generate a corresponding plurality of recorded interference patterns, each of which is comprised of a plurality of pixels;

generating a plurality of pixel intensity data sets, each pixel intensity data set including a pixel intensity level from a corresponding one of the plurality of pixels from each of the recorded interference patterns;

Fourier transforming each pixel intensity data set to generate a corresponding Fourier transformed pixel intensity data set and identifying, for each Fourier transformed pixel intensity data set, one or more spatial frequencies of interest having power values above a predetermined threshold power level;

measuring, for each Fourier transformed pixel intensity data set, the one or more power values of the one or more spatial frequencies of interest to generate one or more measured power values; and constructing a resultant image having a plurality of image pixels, each image pixel corresponding to one of the plurality of Fourier transformed pixel intensity data sets, each image pixel having one or more intensity values corresponding to the one or more measured power values for the corresponding Fourier transformed pixel intensity data set.

2. The method of claim 1, wherein in the varying step, the adjustable path length of the at least one sub-collector is varied between two predetermined optical path lengths.

3. The method of claim 2, wherein the two predetermined optical path lengths are separated by a distance greater than one half of a wavelength of the signal of interest.

4. The method of claim 1, wherein the one or more spatial frequencies of interest in each Fourier transformed pixel intensity data set correspond to the one or more spatial frequencies of interest in every other Fourier transformed pixel intensity data set.

5. The method of claim 1, wherein the one or more spatial frequencies of interest in each Fourier transformed pixel intensity data set correspond to a distance an interference fringe in the plurality of interference patterns is translated across the image plane of the multi-aperture imaging system as the adjustable optical path length of the at least one sub-collector is varied.

6. The method of claim 1, wherein the one or more measured power values for each intensity data set include a plurality of measured power values, and wherein, in the constructing step, the intensity value of each image pixel includes a plurality of spectral intensity data values, each spectral intensity data value corresponding to one of the plurality of measured power values for the corresponding intensity data set.

7. A computer-readable device carrying one or more sequences of instructions for reducing noise in a multi-aperture imaging system having a plurality of sub-collectors, each sub-collector for collecting a portion of a wavefront including noise and a signal of interest, at least one of the sub-collectors having an adjustable optical path length, wherein the one or more sequences of instructions are executable by one or more processors to cause the one or more processors to perform the steps of:

varying the adjustable optical path length of the at least one sub-collector to each of a set of predetermined optical path lengths to generate a plurality of interference patterns, each interference pattern corresponding to a respective one of the set of predetermined optical path lengths;

recording each of the plurality of interference patterns at an image plane of the multi-aperture imaging system to generate a corresponding plurality of recorded interference patterns, each of which is comprised of a plurality of pixels;

generating a plurality of pixel intensity data sets, each pixel intensity data set including a pixel intensity level from a corresponding one of the plurality of pixels from each of the recorded interference patterns;

Fourier transforming each pixel intensity data set to generate a corresponding Fourier transformed pixel intensity data set and identifying, for each Fourier transformed pixel intensity data set, one or more spatial frequencies of interest having power values above a predetermined threshold power level;

measuring, for each Fourier transformed pixel intensity data set, the one or more power values of the one or more spatial frequencies of interest to generate one or more measured power values; and constructing a resultant image having a plurality of image pixels, each image pixel corresponding to one of the plurality of Fourier transformed pixel intensity data sets, each image pixel having one or more intensity values corresponding to the one or more measured power values for the corresponding Fourier transformed pixel intensity data set.

8. The computer-readable device of claim 7, wherein in the varying step, the adjustable path length of the at least one sub-collector is varied between two predetermined optical path lengths.

9. The computer-readable device of claim 8, wherein the two predetermined optical path lengths are separated by a distance greater than one half of a wavelength of the signal of interest.

10. The computer-readable device of claim 7, wherein the one or more spatial frequencies of interest in each Fourier transformed pixel intensity data set correspond to the one or more spatial frequencies of interest in every other Fourier transformed pixel intensity data set.

11. The computer-readable device of claim 7, wherein the one or more spatial frequencies of interest in each Fourier transformed pixel intensity data set correspond to a distance an interference fringe in the plurality of interference patterns is translated across the image plane of the multi-aperture imaging system as the adjustable optical path length of the at least one sub-collector is varied.

12. The computer-readable device of claim 7, wherein the one or more measured power values for each intensity data set include a plurality of measured power values, and wherein, in the constructing step, the intensity value of each image pixel includes a plurality of spectral intensity data values, each spectral intensity data value corresponding to one of the plurality of measured power values for the corresponding intensity data set.

13. A multi-aperture imaging system comprising:

a plurality of sub-collectors, each sub-collector configured to collect a portion of a wavefront including noise and a signal of interest, at least one of the sub-collectors having an adjustable optical path length;

a combiner disposed optically downstream from the plurality of sub-collectors, the combiner configured to combine the collected portions of the wavefront and to interfere the combined collected portions of the wavefront at an image plane of the multi-aperture system; and one or more processors configured to execute the steps of:

varying the adjustable optical path length of the at least one sub-collector to each of a set of predetermined optical path lengths to generate a plurality of interference patterns, each interference pattern corresponding to a respective one of the set of predetermined optical path lengths;

recording each of the plurality of interference patterns at the image plane to generate a corresponding plurality of recorded interference patterns, each of which is comprised of a plurality of pixels;

generating a plurality of pixel intensity data sets, each pixel intensity data set including a pixel intensity level from a corresponding one of the plurality of pixels from each of the recorded interference patterns;

Fourier transforming each pixel intensity data set to generate a corresponding Fourier transformed pixel intensity data set and identifying, for each Fourier transformed pixel intensity data set, one or more spatial frequencies of interest having power values above a predetermined threshold power level;

measuring, for each Fourier transformed pixel intensity data set, the one or more power values of the one or more spatial frequencies of interest to generate one or more measured power values; and constructing a resultant image having a plurality of image pixels, each image pixel corresponding to one of the plurality of Fourier transformed pixel intensity data sets, each image pixel having one or more intensity values corresponding to the one or more measured power values for the corresponding Fourier transformed pixel intensity data set.

14. The multi-aperture imaging system of claim 13, wherein in the varying step, the adjustable path length of the at least one sub-collector is varied between two predetermined optical path lengths.

15. The multi-aperture imaging system of claim 14, wherein the two predetermined optical path lengths are separated by a distance greater than one half of a wavelength of the signal of interest.

16. The multi-aperture imaging system of claim 13, wherein the one or more spatial frequencies of interest in each Fourier transformed pixel intensity data set correspond to the one or more spatial frequencies of interest in every other Fourier transformed pixel intensity data set.

17. The multi-aperture imaging system of claim 13, wherein the one or more spatial frequencies of interest in each Fourier transformed pixel intensity data set correspond to a distance an interference fringe in the plurality of interference patterns is translated across the image plane of the multi-aperture imaging system as the adjustable optical path length of the at least one sub-collector is varied.

18. The multi-aperture imaging system of claim 13, wherein the one or more measured power values for each intensity data set include a plurality of measured power values, and wherein, in the constructing step, the intensity value of each image pixel includes a plurality of spectral intensity data values, each spectral intensity data value corresponding to one of the plurality of measured power values for the corresponding intensity data set.

* * * * *